Dec. 20, 1938.    L. E. LA BRIE    2,140,753
BRAKE
Filed Sept. 7, 1935    7 Sheets-Sheet 1

INVENTOR.
LUDGER E. LaBRIE
BY  A. E. Wilson
ATTORNEY

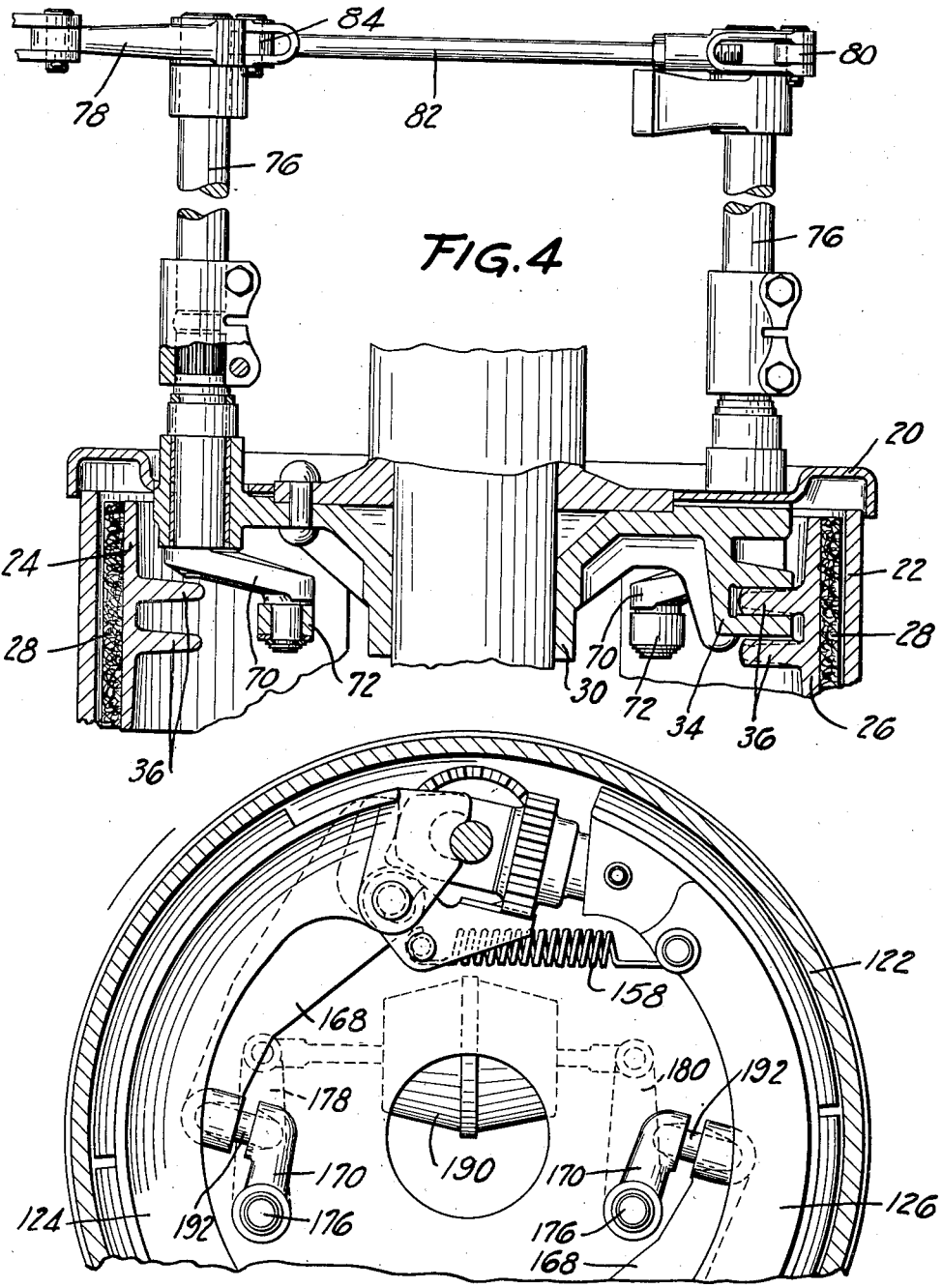

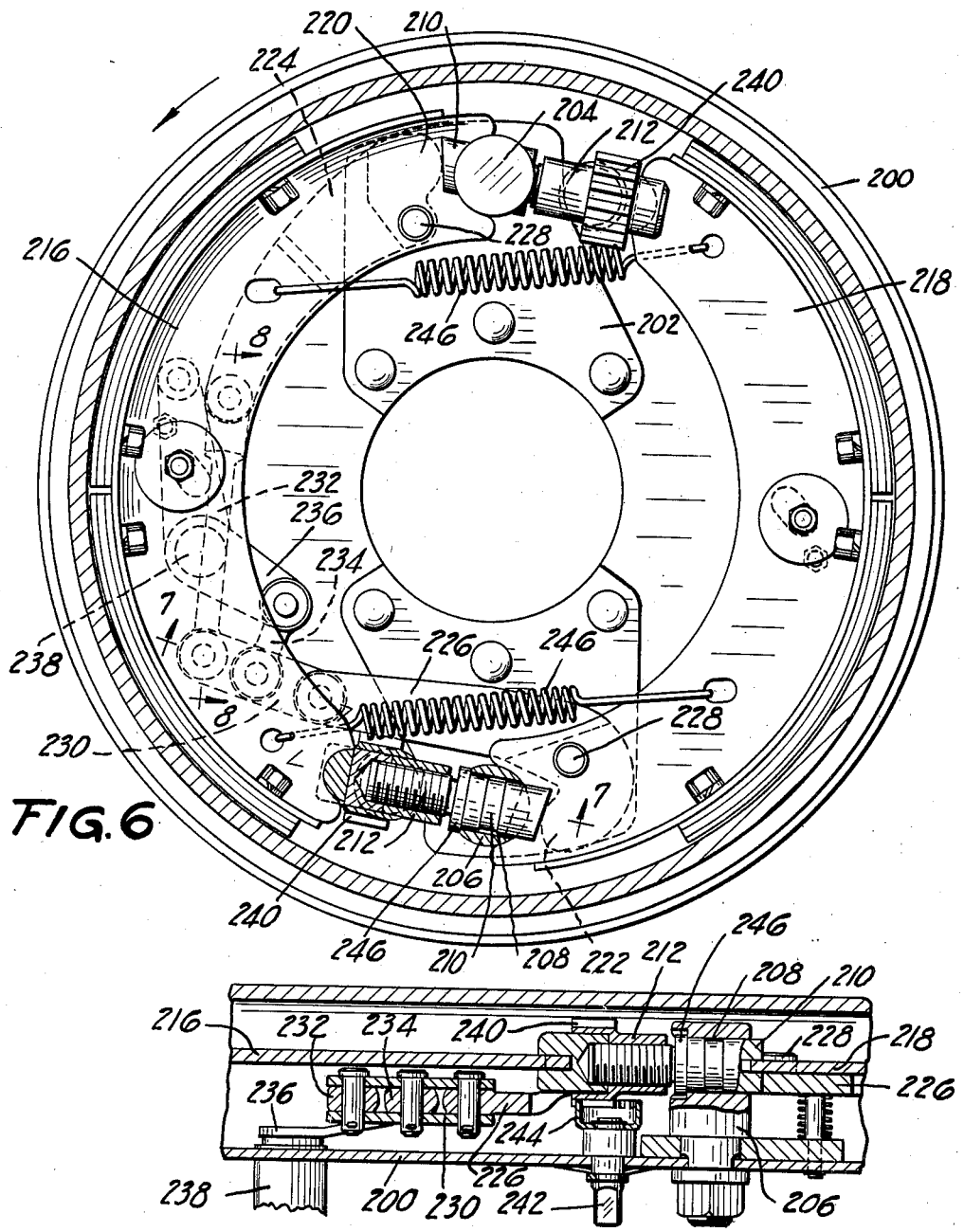

Dec. 20, 1938.   L. E. LA BRIE   2,140,753
BRAKE
Filed Sept. 7, 1935   7 Sheets-Sheet 4

INVENTOR.
LUDGER E. LA BRIE
BY
A. E. Wilson
ATTORNEY

Dec. 20, 1938. L. E. LA BRIE 2,140,753
BRAKE
Filed Sept. 7, 1935 7 Sheets-Sheet 5
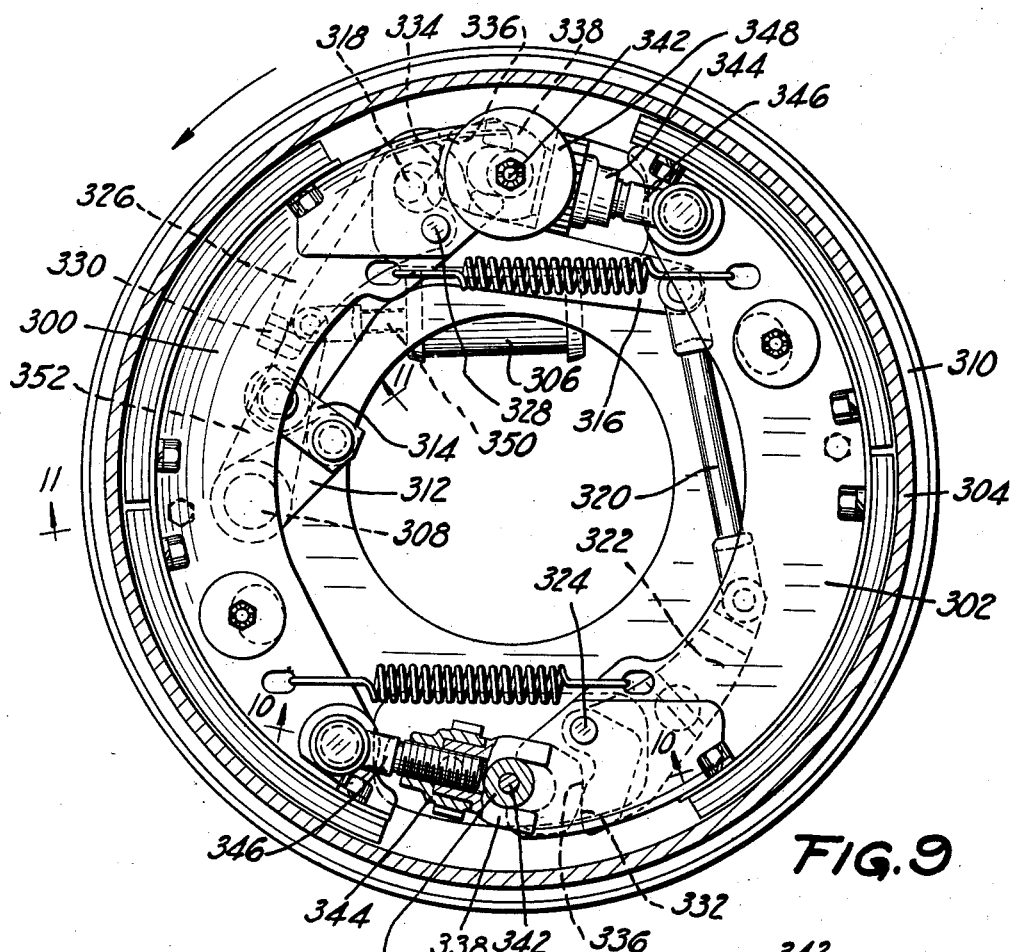
FIG. 9
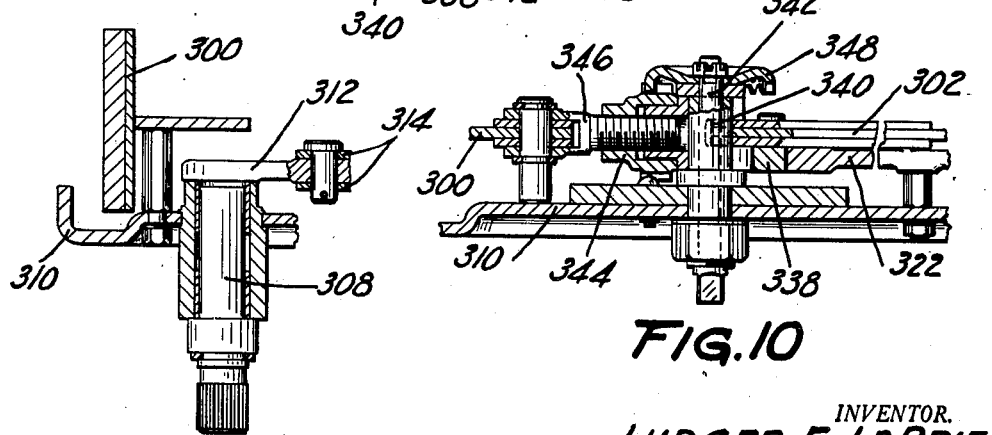
FIG. 11
FIG. 10
INVENTOR.
LUDGER E. LABRIE
BY A. E. Wilson.
ATTORNEY Dec. 20, 1938. L. E. LA BRIE 2,140,753
BRAKE
Filed Sept. 7, 1935 7 Sheets-Sheet 6

INVENTOR
LUDGER E. LaBRIE
BY
J. E. Wilson
ATTORNEY

Dec. 20, 1938.  L. E. LA BRIE  2,140,753
BRAKE
Filed Sept. 7, 1935  7 Sheets-Sheet 7

INVENTOR
LUDGER E. LA BRIE
BY
ATTORNEY

Patented Dec. 20, 1938

2,140,753

UNITED STATES PATENT OFFICE 2,140,753

BRAKE

Ludger E. La Brie, South Bend, Ind., assignor to Bendix Products Corporation, South Bend, Ind., a corporation of Indiana Application September 7, 1935, Serial No. 39,511

17 Claims. (Cl. 188—78)

This invention relates to brakes and more particularly to brakes of the self-energizing type adapted particularly for use in large truck and bus installation. The illustrated brake is of the two-shoe self-energizing type wherein each of the shoes exerts an applying torque in both the forward and reverse directions of application.

An object of this invention is to produce a brake of simple design and construction, capable of absorbing a great quantity of energy, to decrease manufacturing and assembly costs of the larger types of brakes.

A further object of the invention is to provide a brake having improved and simplified actuating and adjusting mechanism.

Another object of the invention is to provide a brake capable of absorbing a great quantity of energy, adapted to be actuated by either hydraulic or mechanical means.

A still further object of the invention is to provide a novel brake structure which may be manufactured more economically than other types of brakes capable of absorbing an equal quantity of energy.

Other features of the invention relate to the provision of a symmetrical brake structure, wherein the actuated and applying structure may be interchanged on opposite sides of a two-shoe brake structure; the provision of a novel equalizing structure; the provision of a brake structure which may be economically adapted for operation of the rear brake or the front brake of a vehicle; the provision of a brake structure having two symmetrical shoes designed to build up a portion of the applying force, after the initial application of the brake by the operator; the provision of a two-shoe brake wherein each of the shoes is adapted to absorb half of the energy absorbed by the entire brake structure; the provision of a novel equalizing system wherein each of the brake shoes are applied with equal force regardless of the direction of rotation of the brake drum.

Other objects and advantageous constructional features will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Figure 4 is a view taken on the line 4—4 of Figure 1, showing a portion of the brake actuating structure;

Figure 5 is a view in side elevation showing a portion of the actuating mechanism of a slightly modified form of the invention;

Figure 6 is a view similar to Figure 1 showing another desirable actuating structure;

Figure 7 is a view taken on the line 7—7 of Figure 6;

Figure 9 is a view similar to Figure 6 showing a brake structure adapted to be actuated by a hydraulic system;

Figure 10 is a view taken on the line 10—10 of Figure 9, showing a portion of the adjusting mechanism;

Figure 11 is a view taken on the line 11—11 of Figure 9, showing a portion of the actuating mechanism;

Figure 1:
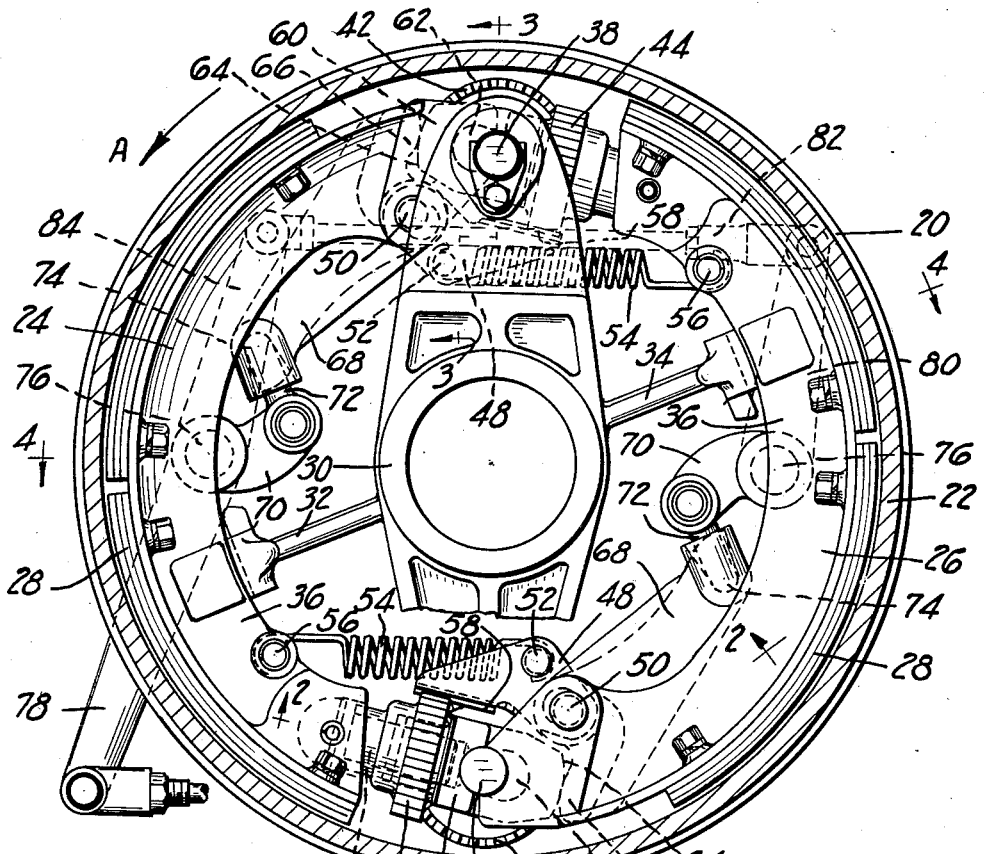
Figure 1 is a view in side elevation showing a portion of a twinplex brake and the applying structure therefor designed in accordance with one embodiment of the invention.

Referring more particularly to Figure 1, there is shown for purposes of illustration one desirable embodiment of the invention wherein the brake structure illustrated has a backing plate 20, a brake drum 22, and a pair of symmetrical brake shoes 24 and 26. The brake shoes 24 and 26 are provided with friction lining 28 adapted to engage the inner surface of the brake drum 22. A spider member 30 is bolted or otherwise secured to the backing plate 20, and is provided with a pair of diametrically opposed arms 32 and 34 adapted to engage a pair of web structures 36 carried by the brake shoes to prevent the brake shoes from moving laterally.

A pair of anchor members 38 and 40 project through the backing plate 20 and are adapted to be engaged by the ends of the brake shoes 24 and 26 to restrain the brake shoes from rotating with the brake drum 22 when the friction lining 28 is urged into engagement with the brake drum 22.

Figure 2:
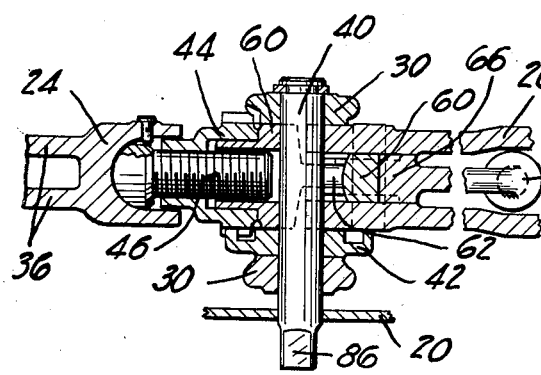
Figure 2 is a view taken on the line 2—2 of Figure 1.
Figure 3:
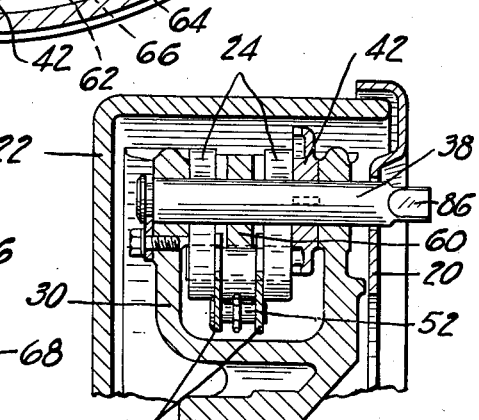
Figure 3 is a view taken on the line 3—3 of Figure 1, showing a portion of the brake adjusting structure.

As will be seen from the drawings, the toe ends of the brake shoes 24 and 26 are circular in shape adapted to abut the anchor members 38 and 40 to restrain the brake shoes from rotation with the brake drum in reverse braking. The heel ends of the brake shoes are pivotally connected to a brake adjusting linkage, more fully shown in Figure 2.

The adjusting mechanism comprises an adjusting wheel 42 keyed or otherwise secured to the anchor members 38 and 40. The adjusting wheel 42 meshes with an adjusting nut 44, having internal threads, adapted to actuate an adjusting screw 46, secured to the heel end of the brake shoes 24 and 26. A clip 48, pivotally mounted to the toe end of the brake shoe on a pin 50, is provided with an offset pin 52, adapted to be engaged by a spring 54 connected to one end of a brake shoe crank pin 56, to withdraw the brake shoes from engagement with the drum and to press a stop member 58 into engagement with the teeth of the adjusting nut 44 to prevent the adjusting mechanism from moving. The adjusting nut 44 is rotatably seated on a cylindrical end section of a link member 60, having an elongated slot 62 surrounding the anchor members 38 and 40, and provided with the rounded end section 64 adapted to be engaged by the actuating end 66 of a cam member 68 pivotally mounted on the toe end of the brake shoe.

The cam members 68 are adapted to be actuated by means of a linkage including the levers 70 rotatably mounted with respect to the backing plate 20, and provided with extension 72 adapted to be received within a slot 74 carried by the end of the cam members 68. The levers 70 are actuated by a pair of shafts 76 projecting through the backing plate 20. One of the shafts 76 is provided with an arm 78 adapted to be actuated by mechanical or power means. The other shaft 76 is provided with an arm 80, and is actuated from the first named shaft 76 by means of a link 82 interconnecting the arm 80 with an arm 84 fixed to the first named shaft 76.

The operation of this device is as follows. To apply the brakes in the forward direction, as shown by the arrow "A" the operator moves the brake applying structure (not shown), thereby rotating the arm 78 and rotating the shaft 76. The arm 84 and the link 82 together with the arm 80 serve to interconnect the two shafts 76, so that upon actuation of the arm 78 both of the shafts 76 are rotated in the counterclockwise direction. The lever 70 fixed to the shaft 76 operates through the extension 72, projecting into the slot 74 to rotate the cam member 68, pivotally mounted on the toe ends of the shoes 24 and 26 at 50, in the clockwise direction. The actuating ends 66 of the cam member 68 engage the rounded end sections 64 of the link member 60 and urge the toe of each of the brake shoes into engagement with the brake drum. Friction between the link member 60 and the anchor assembly prevents the cam member 68 from moving the link sector to apply the heel end of the opposed brake shoe until the slack in the system has been taken up, and the toe ends of the friction elements are moved into engagement with the drum.

In forward braking when the toe of the brake shoe has been moved into engagement with the brake drum the brake drum tends to carry the brake shoe with it in the counterclockwise direction. The heel ends of the brake shoes are restrained from rotating with the brake drum because the link member 60 engages the anchor members 40. A self-energizing action is thus set up which aids the operator to apply the brakes still further. When the slack of the system has been entirely eliminated further actuation of the applying mechanism will rotate the cam member 68 about the pin 50, whereupon the actuating end 66 of the cam member 68 engages the rounded end section 64 of the link member 60 to move the link member with respect to the anchors 38 and 40. The brake shoe is thus urged into engagement with the brake drum 22. Further actuation of the brake applying structure will apply the brakes in proportion to the force exerted.

It will be observed that in this embodiment of the invention the adjustment of the friction lining for wear is made by rotating the anchor members 38 and 40, projecting through the backing plate 20 and provided with flattened surfaces 86 adapted to be engaged by an adjusting wrench. Rotation of the anchor members 38 and 40 operates to rotate the adjusting wheels 42 meshing with the adjusting nuts 44 to rotate the adjusting screws 46 to move the heel members of the brake shoes further away from the anchor members, thereby lengthening the brake shoe. The slotted members 60 carried by the clips 48, pivotally mounted on the toes of the brake shoes at the pin 50, engages the teeth of the adjusting wheel 44 to prevent unintentional misadjustment of the brake structure. The return springs 54 tend to hold the slotted members 60 into engagement with the adjusting wheel 44, and to withdraw the brake shoes from engagement with the brake drum 22 when the operator releases the brake applying structure.

In reverse braking the toe of each of the brake shoes engages the anchor members 38 and 40 respectively to restrain the brake shoes from rotating with the brake drum. The brakes are applied in reverse braking by actuating the cam members 68 in the clockwise direction, whereupon the actuating end 66 of the cam member 68, engages the rounded end section 64 of the link 60 to move the link 62 with respect to the anchor member whereupon each brake shoe is moved into engagement with the brake drum. The brake shoes tend to rotate with the brake drum, whereupon a self-energizing action is set up. The toe members of each brake shoe engage the anchor members 38 and 40 to prevent rotation of the brake shoes, whereupon the effective braking action is in proportion to the applying force on the brake actuating structure. When the applying structure is released, the return spring 54 moves the shoes out of engagement with the brake drum to release the brakes.

It will be apparent that the same applying force will actuate the brakes to a greater extent in forward braking than in reverse braking. This is due to the fact that the effective lever arm of the cam structure and associated parts is greater in forward braking than in reverse. Referring to Figure 1, the effective lever arm in forward braking is C/B, whereas in reverse braking the effective lever arm is A/B. The geometry of the linkage has been worked out in this manner because of the fact that it is generally necessary to exert a greater braking force in the forward direction than in the reverse direction, and because of the fact that smoother operation of this structure results.

It will be observed that connecting the brake shoes through the adjusting linkage as illustrated in this embodiment of the invention results in the provision of floating brake shoes, which can move with respect to the brake drum to give more uniform action over the entire surface of the brake drum, and to equalize brake applying pressure.

It will be observed that a symmetrical braking structure is provided wherein each member of the actuating or applying structure may be interchanged with the diametrically opposed mating element. The provision of the reinforcing spider member results in a stronger brake structure per unit weight than other brakes capable of absorbing equal energy. This invention provides a brake structure which may be manufactured economically and which possesses great inherent strength which adapts it particularly well for use in large truck and bus installations.

The embodiment of the invention illustrated in Figure 5 is similar in many respects to the embodiment illustrated in Figure 1. In this structure the brake shoes 124 and 126 are urged into engagement with the brake drum 122 by means of a power unit 190 interposed between the arms 178 and 180 fixed to the shafts 176. The power unit 190 is of the double acting type, and is designed to rotate the arm 180 in the clockwise direction, and to rotate the arm 178 in the counterclockwise direction, whereupon the actuating lever 170 operates through the pins 192 to rotate the cam members 163 in the clockwise direction to urge the brake shoes 124 and 126 into engagement with the brake drum 122 in the manner as described in connection with Figure 1. To release the brakes the power unit 190 is rendered inoperative, whereupon the return springs 158 release the brake shoes from engagement with the brake drum.

Figure 6 illustrates a modified form of the invention wherein a novel equalizing linkage is employed to distribute the brake applying effort equally to the two brake shoes. The illustrated brake structure includes a stationary backing plate 200 reinforced by a stationary spider member 202. A pair of anchor members 204 and 206 pass through the backing plate 200 and are keyed therein at one end to prevent rotation between the anchor members and the backing plate. The other ends of the anchor members 204 and 206 are formed with apertures 208 to receive plungers 210. One end of the plunger 210 is threaded to engage the internal threads of adjusting nuts 212 adapted to be engaged by the heel ends of the brake shoes 216 and 218. The other end of the plunger 210 is slotted and tapered to receive the web of the brake shoes 216 and 218, and to form a smooth surface for the actuating ends 220 and 222 of the cam members 224 and 226 respectively. The cam members 224 and 226 are pivotally mounted to the heel end of the brake shoes 216 and 218 at the point 228. An equalizing link 230 engages one end of the cam member 226, and the other end of the link engages cam member 224 by means of a link 232. An arm 234 is pivotally connected to the equalizing link 230 at the midsection thereof, and is pivotally connected to an actuating arm 236 fixed to the shaft 238 projecting through the backing plate 200.

The adjusting nut 212 has teeth 240 and is fitted with an adjusting wheel 244 carried by a shaft having a wrench engaging portion 242 projecting through the backing plate 200. The brake shoe return spring 246 interconnecting opposite ends of the brake shoes passes over the end of the adjusting nut 212 to prevent the adjusting nut from rotating except when moved by the adjusting wheel 244.

The operation of this device is as follows. To actuate the brakes the operator rotates the shaft 238, by means of the applying structure. The actuating arm 236 is thereupon rotated in the counterclockwise direction to exert tension on the equalizing link 230 through the arm 234. As the equalizing link is moved in a counterclockwise direction about the shaft 238, a force is exerted upon the cam members 224 and 226 to rotate them in the clockwise direction about the pins 228. The actuating surfaces 220 and 222 of the cam members engage the tapered end sections of the plungers 210 to move the toe ends of the brake shoes 216 and 218 in the counterclockwise direction. When the brake shoes engage the brake drum they tend to move with the brake drum, thereby exerting a force through the heel end of the shoes to urge the plungers 210 through the apertures 208 in anchor members 204 and 206. When the slack of the system has been taken up the cam members 224 and 226 exert a force on the plungers 210 to move the plungers through the anchor members to apply the brake shoes to the brake drum. A floating structure is thus provided wherein the braking effort developed by the brake is proportional to the force exerted on the applying mechanism. As will be observed an enlarged section 246 of the plunger 210 engages the side walls of the anchor members 204 and 206 to prevent the brake shoes from being carried with the brake drum.

In reverse braking the toe end of the brake shoes engages the anchor members 204 and 206 to prevent the brake shoes from rotating with the brake drum. The force applied by the cam members 224 and 226 operates to move the plungers 210 through the anchor members 204 and 206 to apply the heel end of the brake shoes to the drum. As soon as the brake shoes engage the brake drum they tend to rotate therewith to exert a force acting in the direction to aid the operator in applying the brakes. When the actuating mechanism is released the shoe return springs 244 withdraw the brake shoes from engagement with the brake drum.

It will be observed that in this embodiment of the invention an equalizing link is provided, whereupon each of the cam members 224 and 226 operates to apply each of the brake shoes with an equal force.

Figure 9 illustrates a modified form of the invention wherein novel actuating means are employed to apply the brakes. This embodiment of the invention is similar in many respects to the embodiment illustrated in Figure 1. Corresponding parts have therefore been given corresponding reference numerals with the addition of 300. It will be observed that a pair of brake shoes 300 and 302 are urged into engagement with a brake drum 304 by means of a hydraulic cylinder and associated parts 306. The hydraulic unit 306 operates to rotate a shaft 308 projected through the backing plate 310. The shaft 308 is provided with an arm 312 positioned within the backing plate, and adapted to move a link 314 operably connected to one end of an elongated link 316. The link 316 is pivotally mounted at 318 to the toe end of the brake shoe 300. The other end of the link 316 engages one end of a bar 320. The other end of the bar 320 is pivotally connected to the end of a cam member 322, pivotally mounted at 324 to the toe end of the brake shoe 302.

A cam member 326 pivotally mounted at 328 to the toe end of the brake shoe 300 is provided with a lug 330 adapted to be engaged by one end of the elongated link 316 to rotate the cam member 326 in a clockwise direction upon actuation of the elongated link 316 in the same direction. The operating surfaces 332 and 334 of the cam members 322 and 326 are adapted to engage a rounded end section 336 of the slotted link members 338 slidable with respect to the anchor members 340 fixed in the backing plate 310. The anchor members 340 are hollow, and are fixed with respect to the backing plate. An adjusting spindle 342 passes through the hollow anchor member. The other end of the slotted link 338 is adapted to engage an adjusting nut 344 having internal threads to engage the threaded end section of an adjusting screw 346 operably connected to the heel end of the brake shoes 300 and 302. The adjusting nut 344 is rotated by an adjusting wheel 348 fixed to the adjusting spindle 342 passing through the anchor member 340.

The operation of this device is as follows. To apply the brakes in forward braking the operator actuates the applying mechanism, thereby exerting a force on the link 350, operably connected with the hydraulic unit 306 to rotate the arm 352 in the counterclockwise direction. The arm 352 is fixed to the shaft 308, so that upon actuation of the brake applying structure the shaft 308 rotates in a counterclockwise direction. The shaft 308 operates through the arm 312 and the links 314 to rotate the elongated link 316 in the clockwise direction. The sides of the link 316 engage the lug 330 carried by the cam member 326 to rotate the cam member, whereupon the operating surface 334 engages the rounded end section 336 of the slotted link 338. The other end of the link 316 operates through the bar 320 to rotate the cam member 322, pivotally mounted on the toe end of a shoe 302, in the clockwise direction, whereupon the operating surface 332 engages the slotted link 338. The initial application of the brake is employed to take up the slack in the structure, whereupon the toe ends of the shoes 300 and 302 are moved into engagement with the brake drum. The shoes tend to turn with the brake drum, thereby exerting a force on the applying structure tending to further apply the brakes. After the initial application the operating surfaces 332 and 334 of the cam members 322 and 326 engage the rounded end sections 336 of the slotted link 338 to apply the brake in proportion to the force exerted by the operator upon the applying structure.

In reverse braking the operation is similar, however, the toe ends of the shoes engage the anchor member 340 to prevent rotation of the brake shoes with the brake drum. The cam members 322 and 326 operate through the slotted links 338 to move the heel ends of the brake shoes into engagement with the brake drum. A self-energizing action is thus developed in this structure, in a manner similar to that illustrated in the other embodiments of the invention.

Figure 12:
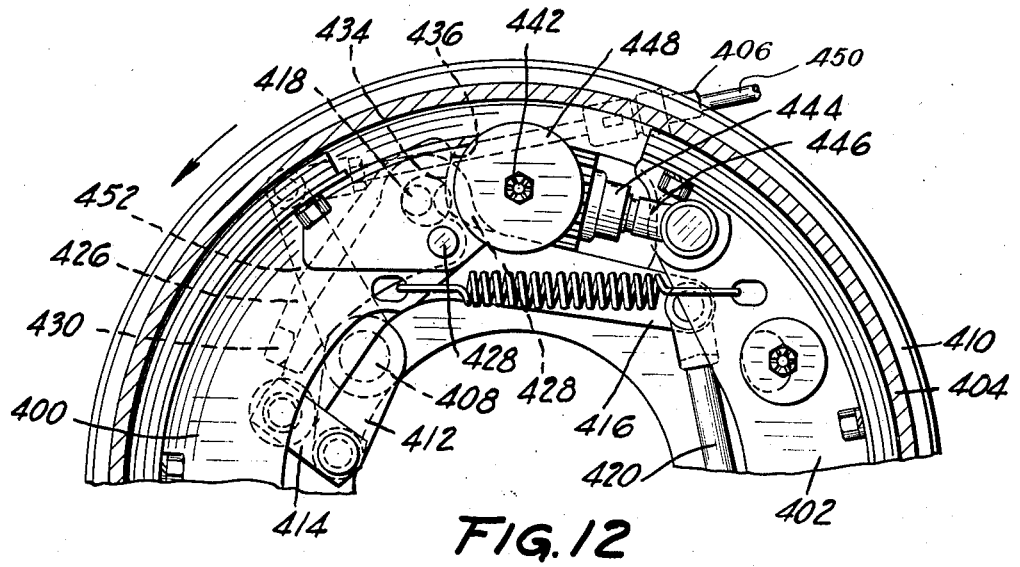
Figure 12 is a view similar to Figure 9 showing the brake structure of Figure 9 adapted for use on the front wheels of a vehicle.
Figure 8:
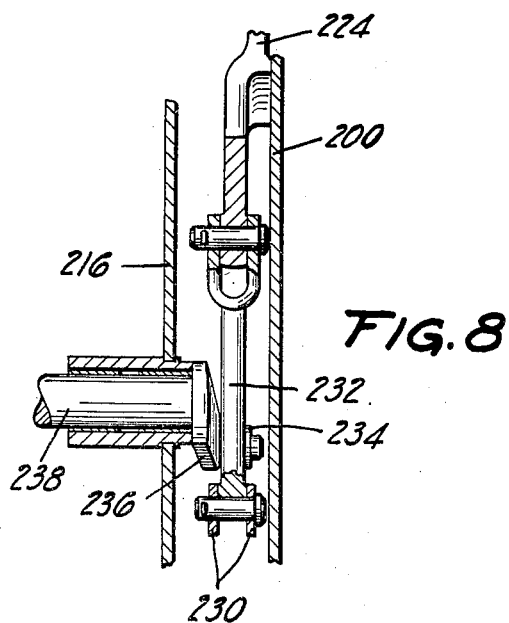
Figure 8 is a view taken on the line 8—8 of Figure 6.
Figure 13:
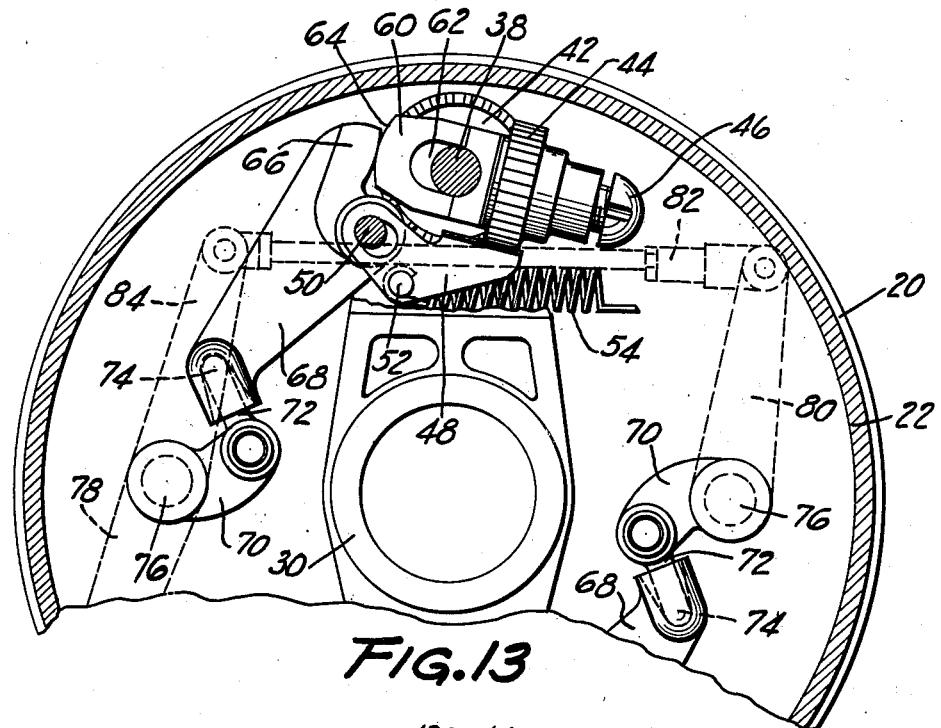
Figure 13 is a fragment of a view similar to Figure 1 of the embodiment of Figure 1 with parts broken away and parts omitted.
Figure 14:
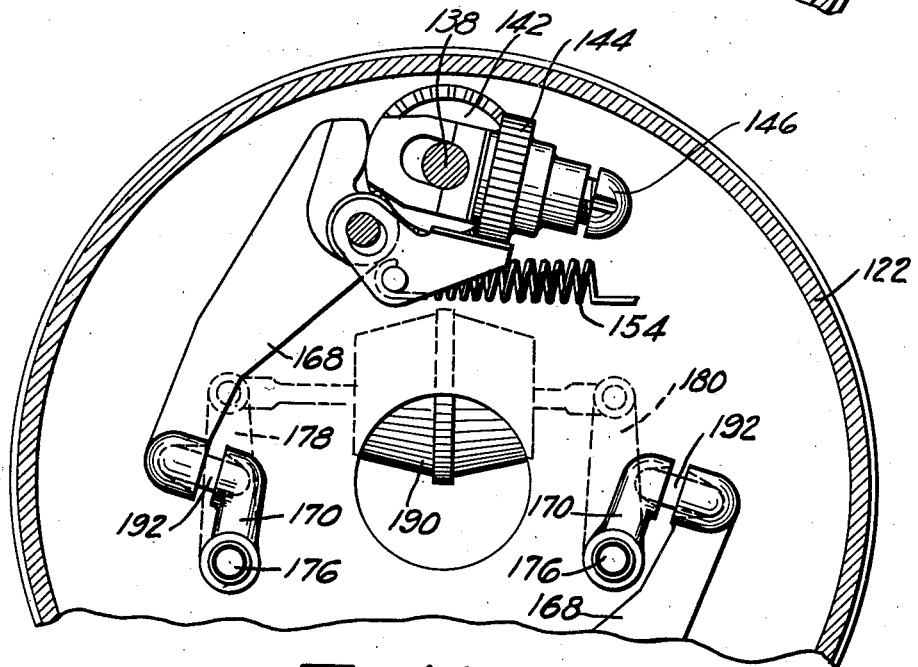
Figures 14, 15, and 16 are views similar to Figure 13 of the embodiments of Figures 5, 9, and 12 respectively.
Figure 15:
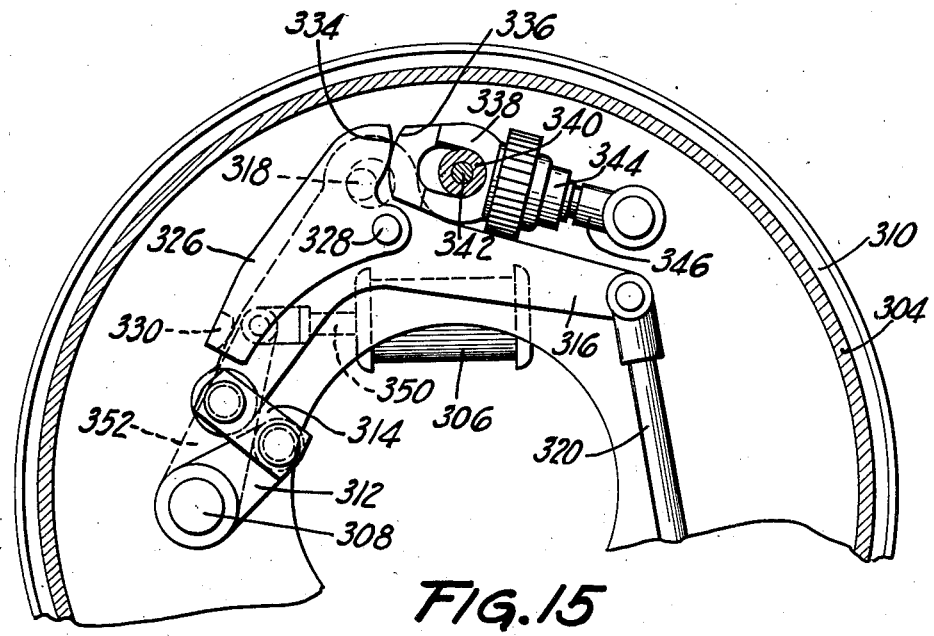
Figure 16:
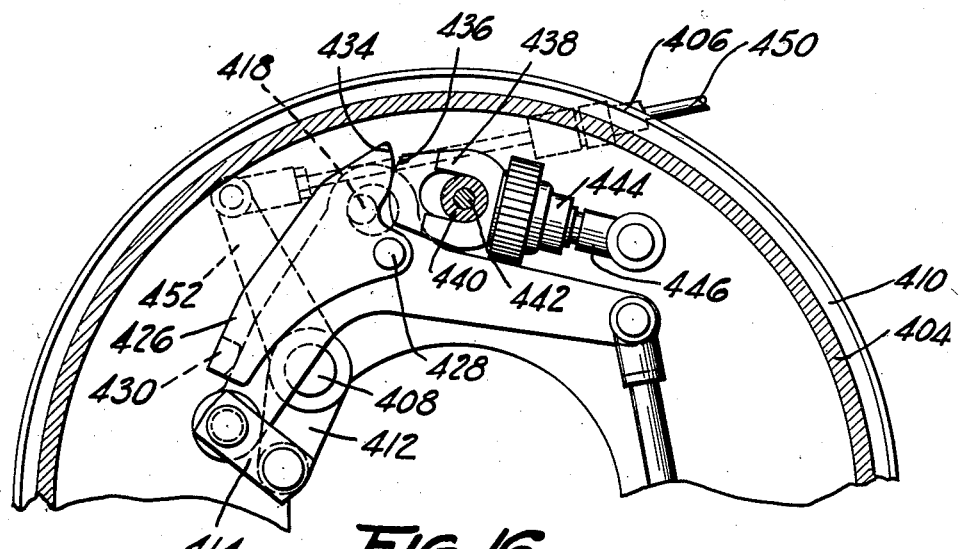

The embodiment of the invention illustrated in Figure 12 is similar in many respects to that illustrated in Figure 9. Corresponding parts have therefore been given similar reference numerals with the addition of 100. This structure, however, is adapted to be actuated by mechanical means rather than by means of a hydraulic unit. It will be observed that in this embodiment of the invention the shaft 408 has been elevated above the lower end of the elongated link 416. This expedient has been resorted to in order to remove the actuating cable 450 as far from the central portion of the brake structure as convenient, and to rotate the shaft in the same direction by means of a force exerted in the opposite direction to that exerted in Figure 9.

The cable 450 is preferably enclosed in a flexible conduit 406 secured to the backing plate and extending to some fixed portion of the vehicle chassis (not shown).

While the invention has been illustrated and described with particular reference to certain preferred embodiments thereof it is to be understood that the scope of the invention is not to be limited to the features discussed, nor otherwise than by the terms of the following claims.

I claim:

1. A vehicle brake having a backing plate, a brake drum, a pair of diametrically opposed anchor members rotatably mounted in the backing plate, a pair of symmetrical brake shoes adapted to engage the anchor members at one end, a pair of adjusting links having lost motion slots adapted to receive the anchor members, connecting means between the adjusting links and one end of the brake shoes, a pair of symmetrical cam actuating members pivotally mounted on the brake shoes and adapted to engage one end of the adjusting links, means to actuate the cam members, and means interconnecting said rotatable anchor members with said adjusting links so constructed and arranged that rotation of the anchor members adjusts the brake.

2. A vehicle brake having a backing plate, a brake drum, a pair of diametrically opposed anchor members mounted in the backing plate, a pair of symmetrical brake shoes adapted to engage the anchor members at one end, a pair of adjusting links having lost motion slots adapted to receive the anchor members, connecting means between the adjusting links and one end of the brake shoes, a pair of symmetrical cam actuating members pivotally mounted on the brake shoes and adapted to engage one end of the adjusting links, a pair of shafts rotatably mounted in the backing plate, arms carried by the shafts and adapted to engage the cam actuating members, connecting means between the shafts outside of the backing plate to rotate the shafts in unison, and means to rotate one of the shafts to apply the brakes.

3. A vehicle brake having a backing plate, a brake drum, a pair of diametrically opposed anchor members rotatably mounted in the backing plate, a pair of symmetrical brake shoes adapted to engage the anchor members at one end, a pair of adjusting links including means to vary the effective length of the brake shoes upon rotation of the anchor members, connecting means between the adjusting links and the anchors including lost motion slots adapted to receive the anchor members, pivotal connecting means between the adjusting links and one end of the brake shoes, a pair of symmetrical cam actuating members pivotally mounted on the brake shoes, and means to actuate the cam members.

4. A brake having a stationary backing plate, a spider member fixed to the backing plate, a pair of diametrically opposed anchor members rotatably mounted in the backing plate and spider member, a pair of symmetrically disposed brake shoes adapted to engage the anchor members at one end, adjusting means including a pair of gear wheels fixed to the anchor members and adjustable links having gear teeth adapted to mesh with the gear wheels one end of each of the adjustable links being pivotally mounted to one end of each brake shoe and the other end of each of the links having a lost motion slot adapted to receive one of the anchor members, means to actuate the brakes including symmetrically disposed cam members pivotally mounted on the brake shoes and adapted to engage one end of each of the adjustable links, and means to actuate the cam members.

5. A brake having a stationary backing plate, a pair of diametrically opposed anchor members rotatably mounted in the backing plate, a pair of brake shoes adapted to engage the anchor members at one end, adjusting means including a pair of gear wheels fixed to the anchor members and adjustable links having gear teeth adapted to mesh with the gear wheels one end of each of the adjustable links being pivotally mounted to one end of each brake shoe and the other end of each of the links having a lost motion slot adapted to receive one of the anchor members.

6. A twinplex brake having a stationary backing plate, a spider member fixed to the backing plate, a pair of diametrically opposed anchor members rotatably mounted in the backing plate and spider member, a pair of symmetrically disposed brake shoes adapted to engage the anchor members at one end, means including laterally projecting arms carried by the spider member and engaging the brake shoes to prevent lateral movement of the brake shoes, adjusting means including a pair of gear wheels fixed to the anchor members and adjustable links having gear teeth adapted to mesh with the gear wheels one end of each of the adjustable links being pivotally mounted to one end of each brake shoe and the other end of each of the links having a lost motion slot adapted to receive one of the anchor members, means to actuate the brakes including symmetrically disposed cam members pivotally mounted on the brake shoes and adapted to engage one end of each of the adjustable links, and means including interconnected rotatable shafts passing through the backing plate to actuate the cam members.

7. In a vehicle brake having a backing plate and a plurality of brake shoes, an anchor member rotatably mounted in the backing plate, adjusting means including a link having a lost motion slot adapted to receive the anchor member, a member pivotally mounted to one end of a brake shoe, threaded means interconnecting the link and member, a geared pinion adapted to actuate the threaded means and a gear wheel fixed to the anchor member and adapted to engage the geared pinion.

8. A truck brake having a backing plate and a plurality of brake shoes, a spider member fixed to the backing plate, an anchor member rotatably mounted in the backing plate and spider members, adjusting means including a plurality of links having lost motion slots adapted to receive the anchor members, members pivotally mounted to one end of the brake shoes, threaded means interconnecting the links and members, geared pinions adapted to actuate the threaded means and gear wheels fixed to the anchor members and adapted to engage the geared pinion to actuate the threaded means to effect adjustment of the brakes upon rotation of the anchor members.

9. A twinplex brake having a brake drum, a backing plate, a pair of anchor members fixed in the backing plate, a pair of brake shoes having one end of each shoe shaped to engage one of the anchor pins, connecting means between the other end of the brake shoes and one of the anchor members, said connecting means including adjusting mechanisms pivotally mounted at one end to one of the brake shoes and provided with a slot at the other end to receive one of the anchor members, means including levers pivotally mounted on the brake shoes and adapted to engage the connecting means to urge the brake shoes into engagement with the brake drum, and power means including a double acting fluid pressure differential actuated motor to actuate said levers.

10. A twinplex brake having a brake drum, a backing plate, a plurality of anchor members fixed in the backing plate, a plurality of brake shoes having one end of each shoe shaped to engage one of the anchor pins, connecting means between the other end of the brake shoes and one of the anchor members, said connecting means including adjusting mechanism pivotally mounted at one end to one of the brake shoes and provided with a slot at the other end to receive one of the anchor members, means including levers pivotally mounted on the brake shoes and adapted to engage the connecting means to urge the brake shoes into engagement with the brake drum, and hydraulic means to actuate said levers.

11. A twinplex brake having a brake drum, a backing plate, a plurality of anchor members fixed in the backing plate, a plurality of brake shoes having one end of each shoe shaped to engage one of the anchor pins, connecting means between the other end of the brake shoes and one of the anchor members, said connecting means including adjusting mechanisms pivotally mounted at one end to one of the brake shoes and provided with a slot at the other end to receive one of the anchor members, means including levers pivotally mounted on the brake shoes and adapted to engage the connecting means to urge the brake shoes into engagement with the brake drum, and hydraulic means to actuate the levers, said actuating mechanism being proportioned to apply the brakes to a greater extent in forward braking than in reverse braking upon the exertion of a given applying force.

12. A vehicle brake having a backing plate, a brake drum, a pair of hollow anchor members fixed in the backing plate, a pair of brake shoes adapted to engage the anchor members at one end, connecting means including a brake shoe adjusting mechanism between the other end of the brake shoes and the anchor members, and manually operable means including a shaft projecting through the anchor members to actuate the adjusting mechanism to adjust the brake.

13. A truck brake having a backing plate, a brake drum, a pair of hollow anchor members fixed in the backing plate, a pair of brake shoes adapted to engage the anchor members at one end, connecting means including a brake shoe adjusting mechanism between the other end of the brake shoes and the anchor members, a pair of cam members pivotally mounted on the brake shoes and engaging the connecting means to urge the brake shoes into engagement with the brake drum, a link pivotally mounted on one of the brake shoes and operably connected to both of the cam members, a shaft operably connected to said link and rotatably mounted in the backing plate, and means to rotate the shaft.

14. A heavy duty brake comprising a drum, a support member, friction means formed with two parallel webs and having separable ends, anchor means mounted on the support between said separable ends engaged by one of said separable ends, an adjusting link secured to the other of said ends having a part slotted to surround said anchor means and extending between the two webs of said first end, a pivot pin extending between the webs of said first end, and a cam member pivoted on the pin between said webs and operably engaging said anchor surrounding part.

15. A heavy duty brake comprising a rotatable drum, a fixed backing plate closing the drum, a fixed spider member within the drum having diametrically opposed forked arms, anchor pins mounted across the forks of each arm, a pair of symmetrical shoes each having double parallel webs and each having one end engaging one of the anchors and having a thrust member engaging the other anchor, the thrust member being slotted to surround the anchor and extending between the webs of the other shoe and cam levers pivotally mounted on the anchored shoe ends between the double webs and engaging the thrust member.

16. A heavy duty brake comprising a rotatable drum, a fixed backing plate closing the drum, a fixed spider member within the drum having diametrically opposed forked arms, anchor pins mounted across the forks of each arm, a pair of symmetrical shoes each having double parallel webs and each having one end engaging one of the anchors and having a thrust member engaging the other anchor, the thrust member being slotted to surround the anchor and extending between the webs of the other shoe and cam levers pivotally mounted on the anchored shoe ends between the double webs and engaging the thrust member, and means for actuating both cam levers simultaneously.

17. A brake comprising a drum, a support, friction means mounted on said support and having adjacent separable ends, anchor means rotatably mounted in said support engaged by one of said separable ends, adjusting linkage extending between the anchor and said other separable end, and means interconnecting said anchor and adjusting linkage for adjusting the brake by rotating said anchor.

LUDGER E. LA BRIE.